(12) United States Patent
Schwartz et al.

(10) Patent No.: US 6,218,634 B1
(45) Date of Patent: Apr. 17, 2001

(54) SWITCH WITH INTEGRATED FLASHER RELAY

(75) Inventors: Allen K. Schwartz, Oxford; Christina Ucar, Clarkston, both of MI (US)

(73) Assignee: Valeo Electrical Systems, Inc., Auburn Hills, MI (US)

( * ) Notice: Subject to any disclaimer, the term of this patent is extended or adjusted under 35 U.S.C. 154(b) by 0 days.

(21) Appl. No.: 09/388,217

(22) Filed: Sep. 1, 1999

(51) Int. Cl.[7] .................................................. H01H 35/04
(52) U.S. Cl. ........................ 200/523; 200/524; 200/61.54; 335/202
(58) Field of Search .................... 200/5 R, 16 R–16 E, 200/17 R, 61.54, 520, 523, 524, 537, 341; 335/185, 196, 199, 202; 340/55, 67, 76, 81 F, 438, 475

(56) References Cited

U.S. PATENT DOCUMENTS

| 4,733,030 | * | 3/1988 | Erdelitsch et al. | 200/61.54 |
| 5,199,558 | * | 4/1993 | Neubauer | 200/531 |
| 5,563,756 | * | 10/1996 | Ignasiak | 361/42 |
| 5,579,903 | * | 12/1996 | McEvilly et al. | 200/524 |
| 5,727,675 | * | 3/1998 | Leveque et al. | 200/524 |
| 5,756,949 | * | 5/1998 | Sato | 200/61.54 |
| 5,823,326 | * | 10/1998 | Saito et al. | 200/524 |

* cited by examiner

Primary Examiner—Michael Friedhofer
(74) Attorney, Agent, or Firm—J. Gordon Lewis

(57) ABSTRACT

A switch apparatus having an integrated flasher relay for activation and deactivation of a hazard signaling system particularly for use in automotive vehicles. The actuator has an integral flasher relay that moves with the actuator through the activation and deactivation operations. The switch is also provided with a detent utilizing a roller for releasably locking the actuator in a predetermined position.

18 Claims, 4 Drawing Sheets

SWITCH WITH INTEGRATED FLASHER RELAY

FIELD OF THE INVENTION

The present invention relates to pushbutton switch assemblies, particularly pushbutton switches used in interior automotive signal and accessory applications and more particularly to automotive pushbutton hazard switches.

BACKGROUND OF THE INVENTION

Interior automotive switches have typically comprised an assembly including a switch housing, terminal, a pushbutton actuator, conductive extensions and a relay. The relay is typically composed of a relay module mounted to a circuit board.

Prior art hazard switch assemblies included a stationary flasher relay requiring a separate protective outer shell protecting it from the elements and damage. The relay circuit board was typically soldered to the conductive extensions for contact with the terminal upon activation.

Prior art pushbutton switches have also utilized detent mechanisms whereby upon force and movement of the pushbutton, the button would temporarily lock in an intermediate position typically activating a signal or accessory, for example, turning on an automobile's hazard lights. Prior art detent mechanisms have included guides in the form of roller pins, spherical balls and wires which were guided by a track.

Prior art pushbutton hazard switches as described above were problematic due to the complexity of the designs, the quantity of components and the spacial and structural relationships between the individual components. A problem often encountered was the requirement to solder the relay circuit board to the conductive extensions or alternatively to the terminals which is costly, inefficient and effectively a permanent connection whereby if a failure occurred in manufacturing or in the field of either of the soldered components, the entire assembly would have to be discarded.

Further, prior art hazard switches have included an illumination bulb on either the circuit board or on the shell whereby activation of the switch would illuminate the bulb, and through a translucent film on the exterior of the pushbutton, provide an operator a visual flashing indicator that the hazard lights or accessories were engaged and functioning. For ease of identification of the hazard switch in the vehicle, some prior art switches had the bulb continuously illuminated while the vehicle's instrument panel lights and/or exterior headlamps were illuminated. Under the latter design, a problem was encountered that due to the stationary nature of the relay and bulb, the intensity of the bulb through the translucent film, and thus the visual indicator, would vary depending on whether the pushbutton was in the engaged or disengaged position.

In addition, prior art detent mechanisms using guides in the form of pins, spheres and wires experienced undesirable feel characteristics due to binding and cocking of the guide in the track throughout travel of the pushbutton.

Consequently, it would be desirable to provide a switch improving the problematic conditions in prior art pushbutton hazard switches and to provide a switch that is inexpensive, facilitates manufacturing, assembly and service, and effectively activates the hazard signal while providing a visual indication of the signal status to the operator. It would also be desirable to provide a smooth, positive feeling detent for activating and deactivating the switch.

SUMMARY OF THE INVENTION

The inventive switch comprises a housing assembly or housing having a terminal mounted thereon and an actuator assembly or actuator having an integrated flasher relay therein whereby the actuator is slidingly displaced and moves along the housing placing the actuator in contact with the terminal thereby activating or deactivating the flasher relay.

In a preferred aspect of the invention, the actuator assembly includes a casing and a detachable pushbutton. The casing further has a cavity and a track within the cavity which slidingly receives the circuit board of the flasher relay. The pushbutton attaches to the casing and substantially surrounds the relay. This arrangement combines the advantages of a relay that moves with the pushbutton, allows accessibility of the relay, and affords protection of the relay from damage in use.

In another preferred aspect of the invention, the actuator further includes an insert that is integrally molded in the casing. The insert provides a conductive electrical connection between the circuit board and the terminal. This arrangement has the advantage of eliminating inefficient and costly solder connections through an electrical connection between the flasher relay and the insert.

In an additional preferred aspect of the invention, the flasher relay further includes an illuminatable device which is mounted to the circuit board adjacent the pushbutton. This arrangement has the advantage of the illuminatable device remaining a constant distance from the indicator lens of the pushbutton.

In a preferred aspect of the invention, the housing and the actuator assembly have slidably interconnecting guides and rails providing for sliding engagement of the actuator assembly in the housing. This provides for smooth and positive movement of the actuator.

In another preferred aspect of the invention, the switch includes a detent for releasably locking the actuator in a predetermined position relative to the terminal. The detent includes a roller having an inner and an outer shoulder separated by a hub. The roller further includes a pin extending outwardly from the outer shoulder opposite the hub. The roller is slidingly engaged in the actuator casing and the pin is guided by a track in the housing. This arrangement provides for smooth movement and positive locking of the actuator relative to the terminal.

These and other features and advantages of the invention will be apparent upon reading the following specification which, along with the drawings, describes and discloses preferred and alternative embodiments of the invention in detail.

BRIEF DESCRIPTION OF THE DRAWING

The description herein makes reference to the accompanying drawings wherein like reference numerals refer to like parts throughout the several views, and wherein.

DESCRIPTION OF THE PREFERRED EMBODIMENTS

Figure 1:
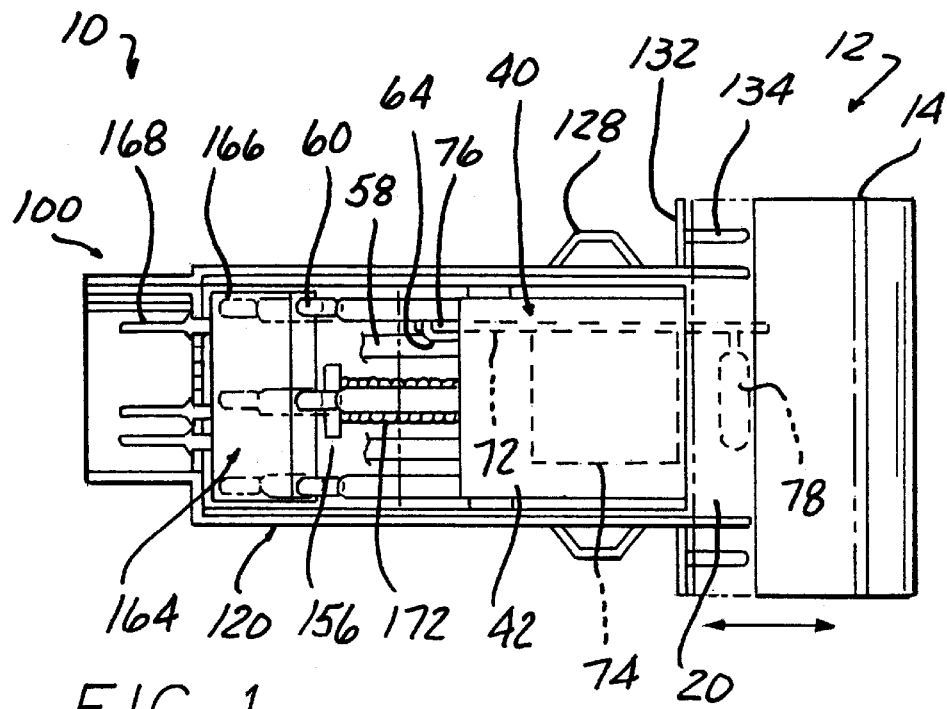
FIG. 1 is a cut away, bottom view of the switch showing the actuator assembly installed in the housing assembly.
Figure 2:
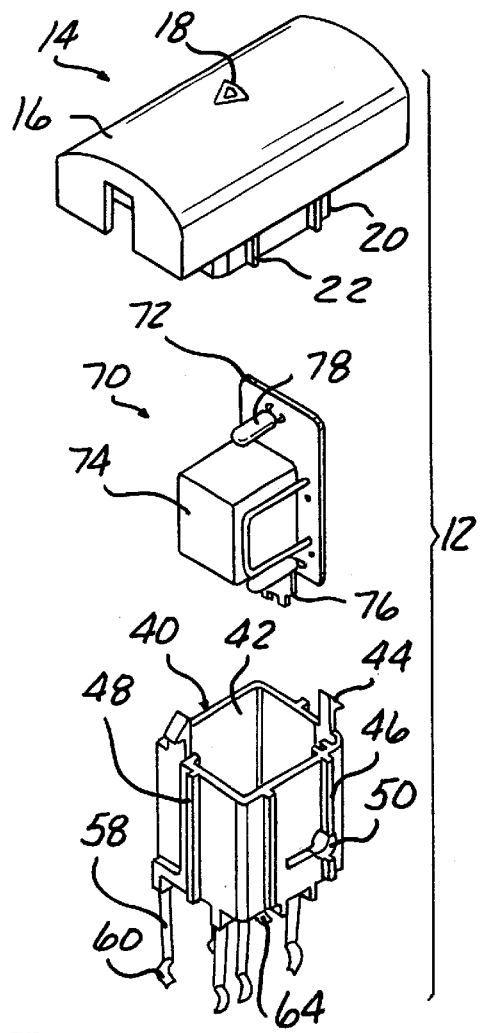
FIG. 2 is an exploded view of the actuator assembly.
Figure 6:
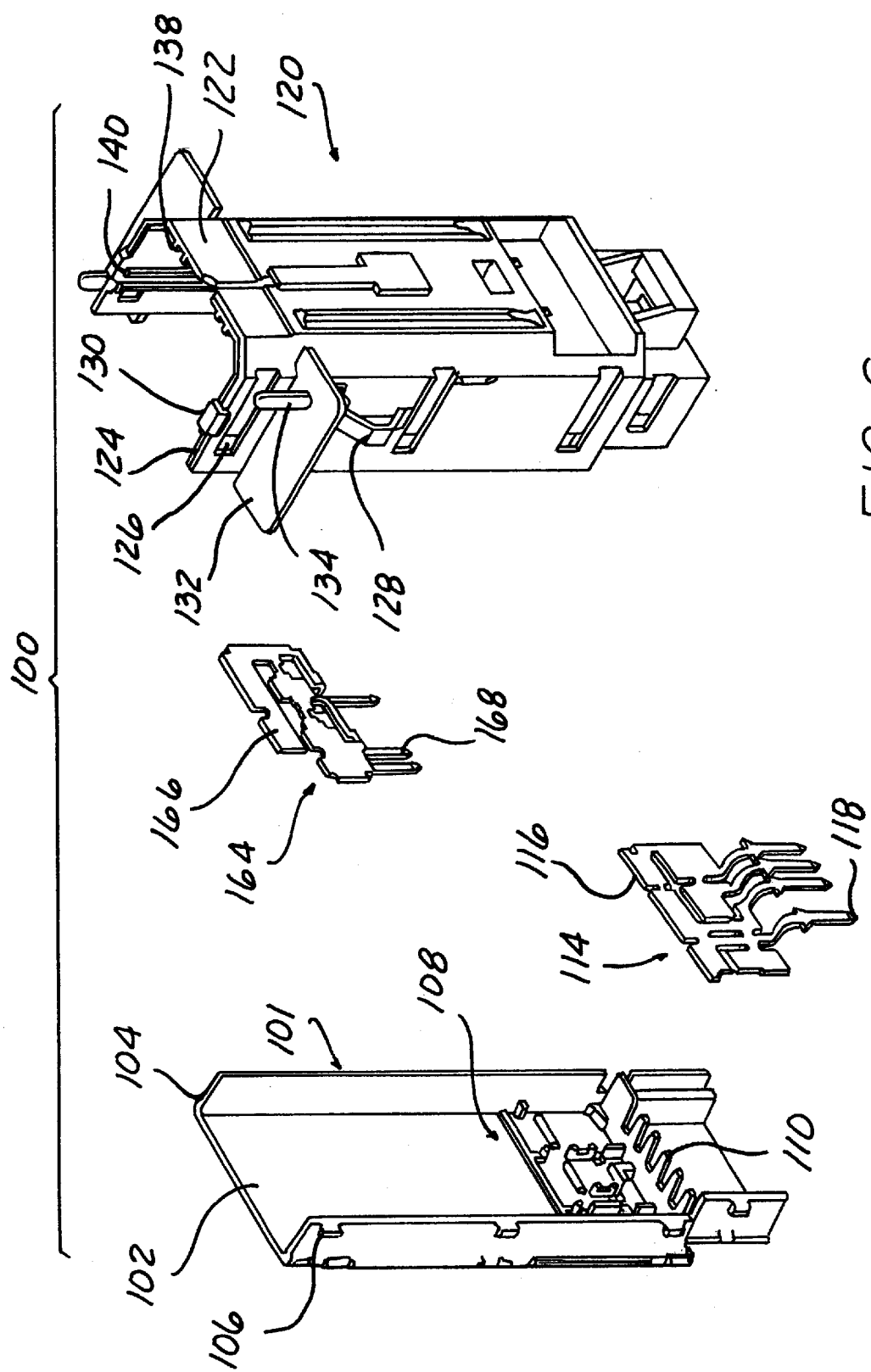
FIG. 6 is an exploded view of the housing assembly.
Figure 8:
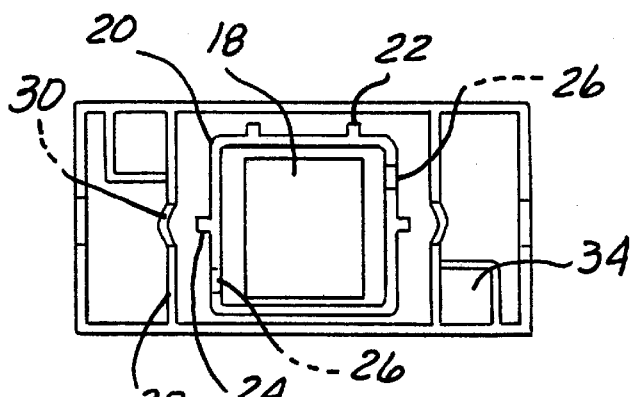
FIG. 8 is an end view of the pushbutton.
Figure 9:
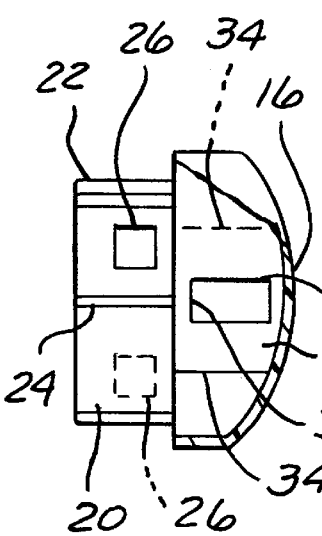
FIG. 9 is a cut away, side view of the pushbutton.

Referring to FIGS. 1, 2 and 6, a switch assembly 10 with an integrated flasher relay is illustrated. Assembly 10 is comprised of an actuator assembly 12 and a housing assembly 100. The actuator assembly 12 is composed of a button 14 having a face 16 and a visual indicator lens 18. The button 14 includes a hollow casing cap 20 integrally formed therein. As seen in FIGS. 8 and 9, the cap 20 has upper guide rails 22 and side guide rails 24 along the length of the cap. The cap 20 further includes offset apertures 26 and ribs 28 having closed slots 30, each slot 30 having a rearward stop 32. The button 14 also has a pair of offset recesses 34 on the outside of ribs 28. The button 14 is preferably made from an injection moldable polymer but may be made from other like materials.

Figure 3:
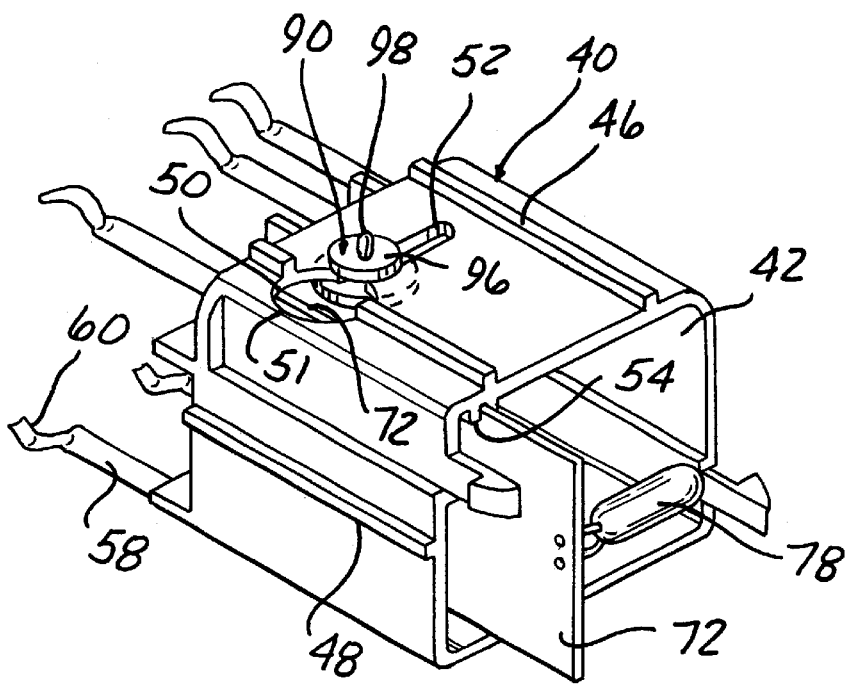
FIG. 3 is a partial perspective view of the actuator assembly showing the flasher relay and detent roller in an installed position.
Figure 4:
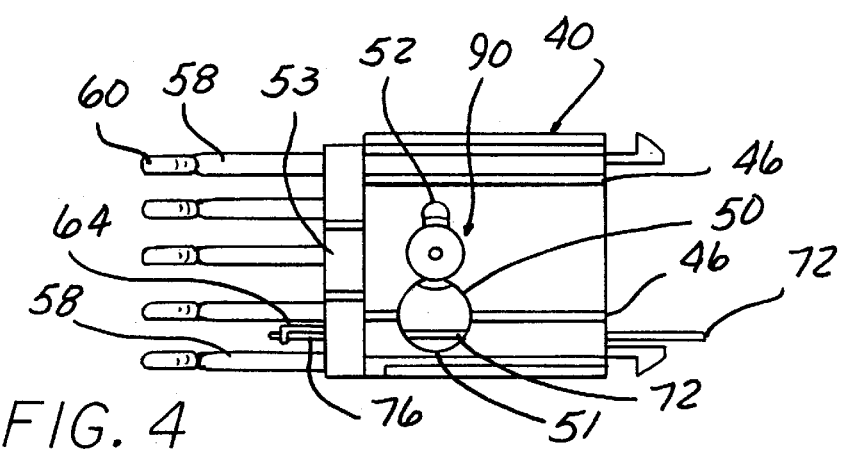
FIG. 4 is a partial top view of the actuator assembly showing the flasher relay and detent roller in an installed position.

Referring to FIGS. 2 and 3, the actuator assembly 12 includes a casing 40. Casing 40 is a four-sided polygon having a cavity 42. The casing 40 has a pair of spring projections with tapered hook ends 44 integrally molded therein. Upon attachment of the casing 40 to button 14, the projections 44 releasingly snap to the casing cap 20 through apertures 26 thereby abutting casing 40 to cap 20. As best seen in FIGS. 2 and 3, casing 40 includes a like pair of upper guide rails 46 and side guide rails 48 on the adjacent walls. Casing 40 also has a keyhole-shaped, closed slot 50 having a first width 51 of greater distance than a second width 52 as shown in FIGS. 3 and 4. Referring to FIGS. 2–4, casing 40 also comprises a biasing member seat 53 adjacent the slot 50 and a track 54 within cavity 42. The casing 40 is preferably made from an injection moldable polymer, but may be made from other like materials.

Referring to FIG. 2, the actuator assembly 12 includes a flasher relay assembly 70 having a relay module 74, an electrical connector portion 76 and an illuminatable device 78 all mounted to a circuit board 72. The flasher assembly 70 is integrated in the actuator assembly 12 through inserting flasher assembly 70 into casing 40 through engagement of the circuit board 72 and casing track 54 in the orientation shown in FIGS. 2 and 3. Upon attachment of the button 14, cap 20 substantially surrounds flasher assembly 70 within the cavity 42 and hollow portion of cap 20.

Figure 5:
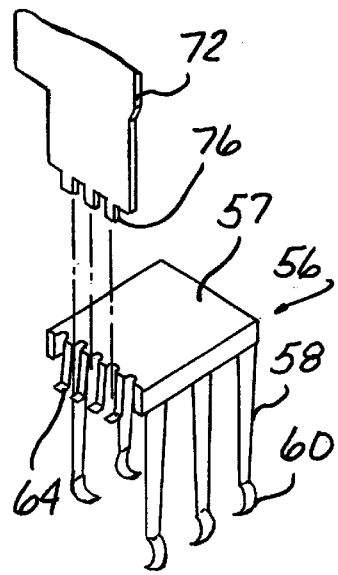
FIG. 5 is a partial exploded view of the actuator insert with the casing removed and the flasher relay circuit board.

Now referring to FIGS. 2 and 5, actuator assembly 12 further comprises an insert 56 integrally molded with casing 40. The insert 56 includes leaf extensions 58 having leaf contacts 60. The leaf contacts 60 are in conductive contact with grid 57. The grid 57 is in conducting connection with relay contacts 64. Upon installation of flasher assembly 70 in casing 40, connector portion 76 slidingly engages relay contacts 64 thereby providing an electrical connection between flasher assembly 70 and leaf extensions 58. Insert 56 may be made from any electrically conductive material.

Figure 10:
FIG. 10 is a perspective view of the detent roller.

Referring now to FIG. 10, switch 10 further comprises a detent providing for a two position, on/off operation. The detent includes a roller 90 having an inner shoulder 94 and an outer shoulder 96 separated by an axial hub 92. Roller 90 has a pin 98 extending outwardly from outer shoulder 96 opposite hub 92. Shoulders 94 and 96 are preferably circular in shape having diameters less than the first width 51 of slot 50, but greater than the second width 52 of slot 50 as seen in FIGS. 3 and 4. Roller 90 is inserted into casing 40 prior to installation of flasher relay 70. As seen in FIGS. 3 and 4, inner shoulder 94 is inserted through first width 51 of keyhole slot 50 and thereafter, roller 90 is positioned into the second, more narrow width 52 thereby preventing the roller 90 from falling in or out of the casing through first width 51. Upon installation of flasher relay assembly 70 in the casing 40 through track 54, the roller 90 is prevented from sliding to first width 51 through contact of inner shoulder 94 and circuit board 72. This prevents the roller from falling out of the casing through slot 50.

Referring to FIG. 6, switch 10 includes a housing assembly 100 consisting of a left housing 101, a right housing 120 and left and right 114, 164 terminals respectively. The left housing 101 has a base wall 102, side walls 104, a terminal recess 108, terminal stops 110 and latches 106 integrally molded therein.

Right housing 120 includes a base wall 122 and side walls 124. Side walls 124 of right housing 120 further include latch apertures 126, mounting tabs 128 and spring projections 130 all integrally molded therein as shown in FIG. 6. Side walls 124 further include flanges 132 having studs 134 extending outwardly therefrom and integrally molded therein. Side walls 124 also have guides 140 integrally molded therein.

Figure 7:
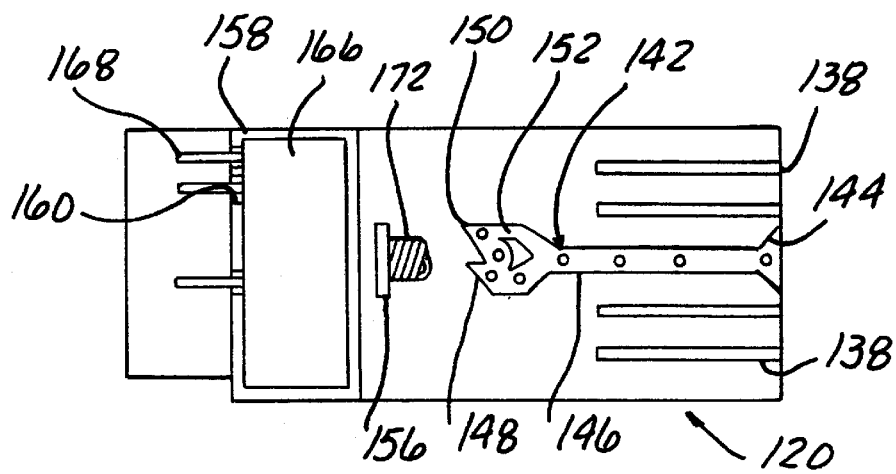
FIG. 7 is a cut away, bottom view of the housing assembly.

As best seen in FIG. 7, base wall 122 of right housing 120 includes a terminal recess 158, terminal stops 160 a biasing member seat 156 and a pair of upper guides 138. Guides 138 and 140 slidingly engage rails 46 and 48 respectively of actuator assembly 12. It is understood the present invention contemplates that the rails may be molded into the housing and the guides molded in the casing. Base wall 122 further includes a detent track 142 integrally molded therein. Track 142 includes a tapered opening 144, an elongate portion 146 extending therefrom ending in an enlarged area bifurcated by a catch 152. Track 142 further includes a first stop 148 and a second stop 150 adjacent the catch 152. The width of track 142 through middle portion 146 and around catch 152 is slightly greater than the width of pin 98 of detent roller 90. Left housing 101 and right housings 120 are preferably made from an injection molded polymer, but other like materials may be used.

The detent roller inner and outer shoulders 94 and 96 respectively assist the roller 90 in staying in a planar relationship with the casing thereby keeping the pin 98 substantially perpendicular to the casing and aligned with the guide track 142 throughout travel of the actuator assembly 12. This increased alignment reduces binding of the actuator assembly 12 in the housing assembly 100 and provides a smooth feeling through button 14 for the operator. Roller 90 freely moves within the first width 52 of slot 50 through contact of hub 92 along the casing 40.

Referring to FIG. 6, terminals 114 and 164 include terminal pins 118 and 168, respectively. Terminals 114 and 164 are made of any common electrically conducting material and are attached to the left 101 and right 120 housings in recesses 108 and 158 respectively through known techniques such as heat staking, adhesive or mechanical fasteners. The terminal stops 110 and 160 prevent movement of the terminals 114 and 164 respectively upon installation of a wiring connector (not shown) over terminal pins 118 and 168. Subsequent to attachment of terminals 114 and 164 to the left housing 101 and right housing 120 respectively, the left housing 101 is releasably connected to the right housing 120 through engagement of latches 106 through apertures 126 on the right housing 120 thereby forming a closed-walled polygonal housing with a through cavity.

Referring now to FIGS. 1 and 7, switch 10 further includes a biasing member 172, preferably in the form of a compression spring, which is positioned in biasing member seat 156 of right housing 120. Upon installation of actuator assembly 12 into housing assembly 100, the opposite end of biasing member 172 is positioned in biasing member seat 53 of casing 40. The biasing member 172 provides a physical force biasing the actuator assembly 10 away from terminals 114 and 164. It is understood that devices other than a compression spring may be used to bias the actuator away from the housing. Such other devices may include a tension spring, a leaf spring a conical spring washer or other mechanical resistance devices.

Upon installation of the detent roller 90 in the casing 40 and subsequent installation of the flasher assembly 70 in the casing 40, the pushbutton 14 is attached to the casing as previously described completing actuator assembly 12 as seen in FIG. 7. Biasing member 172 is positioned in biasing member seat 156 in right housing 120 and extends outwardly therefrom.

Actuator assembly 12 is installed into the housing assembly 100 through alignment and sliding engagement of upper rails 46 and side rails 48 of casing 40 with upper guides 138 and side guides 140 of right housing 120 respectively. As depicted in FIGS. 1 and 7, upon further insertion and engagement of actuator 12 within housing 100, roller 90 is positioned in keyhole slot 50 such that pin 98 contacts and is guided by tapered opening 144 in the right housing 120. Upon further insertion and engagement of actuator 12 within housing 100, biasing member 172 contacts biasing member seat 53 of casing 40 thereby providing resistance or bias from further insertion of the actuator toward the terminals. Through additional force exerted on the actuator 12 overcoming the resistance of biasing member 172, projections 130 on the right housing 120 contact the ribs 28 of button 14. Additional force applied to the actuator will releasably lock projections 130 through slots 30 in the ribs 28 of button 14. Studs 134 on flanges 132 will also enter and be guided into recesses 34 of button 14 thereby resisting twisting or torsion of actuator assembly 12 relative to housing assembly 100. Without additional force applied to the button, the resistance provided by biasing member 172 forces the actuator assembly 12 in a position such that the latches 130 are in abutting engagement with the stops 32 of slots 30 as shown by solid lines in FIG. 1. This position of the actuator relative to the housing is the non-engaged or "off" position of the switch whereby the flasher relay is not activated and thus not flashing.

Referring now to FIGS. 1 and 7, in operation, force is applied to the actuator assembly 12 through the button 14 thereby moving actuator assembly 12 with integrated flasher relay 70 towards terminals 114 and 164 along upper guides 138 and side guides 140. Pin 98 is guided in detent track 142 and, through guidance of catch 152, is directed toward and abuts first stop 148 thereby preventing further engagement of actuator 12 in housing 100. Flanges 132 provide an additional stop preventing further movement of actuator 12 through contact with button 14 shown in phantom in FIG. 1. As best seen in FIG. 7, upon release of pressure on button 14, the resistance by biasing member 172 will automatically force actuator assembly 12 away from the terminals. Upon movement of the actuator assembly 12 away from the terminals, pin 98 will abuttingly engage return catch 152 and thereby prevent further movement of actuator 12 away from the terminals while the release of force on button 14 is maintained. Slot 50 allows smooth adjustment of roller 90 to properly seat pin 98 on catch 152. At this point, leaf extensions 58 are adjacent the contact plates 116 and 166 of terminals 114 and 164 thereby placing in electrical engagement contacts 60 with contact plates 116 and 166 as shown in phantom in FIG. 1. This position of the actuator 12 whereby the pin 98 is in abutting engagement with catch 152 and the leaf contacts 60 are in electrical contact with contact plates 116 and 166, defines the active or "on" position of the switch thereby activating the flasher relay and further providing a flashing visual indication through lens 18 by activation of illuminatable device 78.

To deactivate or turn off the flasher relay, pressure is again applied to the actuator assembly 12 through button 14 to overcome the resistance of biasing member 172. Upon such force, pin 98 is thrust towards the second stop 150 of detent track 142 as best seen in FIG. 7. Movement of actuator 12 toward the terminal is stopped upon pin 98 contacting second stop 150 of track 142 and through contact of button 14 and flanges 132 as shown in phantom in FIGS. 1 and 7. Upon release of pressure from button 14, the resistance of biasing member 172 will again bias or force actuator assembly 12 away from the terminals and pin 98 will be biased away from second stop 150, thrust past catch 152 and will be guided along track 142 toward its original position. Biasing member 172 will bias actuator assembly 12 away from the terminals until latches 130 of right housing 120 abuttingly engage stops 32 of guide slots 30 in button 14. Such movement will translate leaf contacts 60 from contact plates 116 and 166 thereby deactivating the flasher relay and ceasing flashing of illuminatable device 78 and visual indication of flashing through lens 18.

Reactivation of the flasher relay switch is achieved through again applying pressure to the actuator assembly 12 through button 14 as previously described to complete another cycle.

What is claimed is:

1. A switch comprising:
   an actuator having an integrated relay; and
   a housing having a terminal, the actuator slidingly engaging the housing thereby placing the actuator in contact with the terminal.

2. The switch of claim 1 wherein the actuator further comprises a casing having a cavity, the casing partially surrounding the relay.

3. The switch of claim 2 wherein the actuator further comprises a pushbutton, the pushbutton releasably attaching to the casing thereby substantially surrounding the relay.

4. The switch of claim 2 wherein the casing further comprises an elongate track within the cavity for sliding engagement of the relay in the casing.

5. The switch of claim 1 further comprising an illuminatable device.

6. The switch of claim 1 wherein the actuator further comprises an insert, the insert providing for contact of the relay with the terminal.

7. The switch of claim 1 wherein the housing and the actuator have slidably interconnecting guides and rails for sliding engagement of the actuator in the housing.

8. The switch of claim 1 further comprising a biasing member biasing the actuator in one direction relative to the terminal.

9. The switch of claim 1 further comprising a detent for releasably locking the actuator at a predetermined position relative to the terminal.

10. The switch of claim 9 wherein the detent further comprises a roller and a track; the actuator further having a thickness and a slot, the roller is movably positioned in the slot and slidingly translates along the track.

11. The switch of claim 10 wherein the roller further comprises a pin and an inner and an outer shoulder separated by a hub, the hub having an axial length at least as great as the thickness of the actuator, the pin extending outwardly from the outer shoulder opposite the hub; and wherein the slot is positioned transverse to the track and further having a first and a second width, the first width is greater than the second width.

12. A switch comprising:
   an actuator having an integrated relay and an insert;
   a housing having a terminal, the actuator slidingly engaging the housing placing the insert in contact with the terminal;
   a biasing member for biasing the actuator in one direction relative to the terminal; and
   a detent for releasably locking the actuator in a predetermined position relative to the terminal.

13. The switch of claim 12 wherein the actuator further comprises a casing having a cavity, the casing partially surrounding the relay.

14. The switch of claim 13 wherein the actuator further comprises a pushbutton, the pushbutton releasably attaching to the casing thereby substantially surrounding the relay.

15. The switch of claim 12 wherein the detent further comprises a roller and a track; the actuator further having a thickness and a slot, the roller is movably positioned in the slot and slidingly translates along the track.

16. The switch of claim 15 wherein the roller further comprises a pin and an inner and an outer shoulder separated by a hub, the hub having an axial length at least as great as the thickness of the actuator, the pin extending outwardly from the outer shoulder opposite the hub; and wherein the slot is positioned transverse to the track and further having a first width and a second width, the first width is greater than the second width.

17. The switch of claim 16 wherein the slot is located on the actuator and the track is located on the housing.

18. In a switch detent apparatus having a guide track and a guide, the improvement comprising:
   a casing having a thickness and a slot, the slot positioned transverse to the guide track and having a first and second width wherein the first width is greater than the second; and
   a roller having a pin and an inner and an outer shoulder separated by a hub, the inner and outer shoulder having a width less than the slot first width but greater than the slot second width, the hub having an axial length at least as great as the thickness of the casing, the pin extending outwardly from the outer shoulder opposite the hub whereby the roller translates along the slot and the pin translates along the guide track.

* * * * *